United States Patent
Pirzada et al.

(10) Patent No.: US 8,660,486 B2
(45) Date of Patent: Feb. 25, 2014

(54) METHOD AND SYSTEM FOR PROVIDING CONCURRENT WIRELESS UNIVERSAL SERIAL BUS (WUSB) HUB AND WIRELESS AUDIO/VIDEO INTERFACES WITHIN A SINGLE DEVICE

(75) Inventors: Fahd B. Pirzada, Austin, TX (US); Pratik M. Mehta, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 1272 days.

(21) Appl. No.: 12/072,864

(22) Filed: Feb. 28, 2008

(65) Prior Publication Data
US 2009/0221234 A1     Sep. 3, 2009

(51) Int. Cl.
*H04B 7/00*     (2006.01)

(52) U.S. Cl.
USPC .............. 455/41.2; 455/41.3; 710/8; 710/300

(58) Field of Classification Search
USPC .................. 455/41.2, 41.1, 41.3, 101, 552.1; 710/300, 8, 100
See application file for complete search history.

(56) References Cited

U.S. PATENT DOCUMENTS

| | | | | |
|---|---|---|---|---|
| 6,873,611 | B2 | 3/2005 | Rios | 370/338 |
| 7,046,618 | B2 | 5/2006 | Santhoff et al. | 370/205 |
| 7,050,452 | B2 | 5/2006 | Sugar et al. | 370/465 |
| 7,164,886 | B2 | 1/2007 | Mowery et al. | 455/41.2 |
| 7,263,573 | B2 | 8/2007 | Aull et al. | 710/310 |
| 7,756,068 | B2 * | 7/2010 | Tao et al. | 370/311 |
| 2002/0159419 | A1 | 10/2002 | Morris | 370/338 |
| 2003/0081630 | A1 | 5/2003 | Mowery et al. | 370/466 |
| 2004/0198429 | A1 | 10/2004 | Yen et al. | |
| 2004/0203415 | A1 | 10/2004 | Wu | |
| 2005/0177669 | A1 | 8/2005 | Peters et al. | |
| 2005/0180368 | A1 | 8/2005 | Hansen et al. | 370/338 |
| 2005/0266808 | A1 * | 12/2005 | Reunamaki et al. | 455/101 |
| 2005/0278461 | A1 | 12/2005 | Ohta | |
| 2006/0020723 | A1 | 1/2006 | Chia-Chun | |
| 2006/0117127 | A1 | 6/2006 | Milan et al. | |
| 2006/0233191 | A1 * | 10/2006 | Pirzada et al. | 370/463 |
| 2007/0073935 | A1 | 3/2007 | Kim et al. | 710/62 |
| 2008/0008141 | A1 * | 1/2008 | Tchigevsky et al. | 370/338 |

OTHER PUBLICATIONS

Intel, "*Ultra-Wideband (UWB) Technology,*" Intel® Products, 2004.

* cited by examiner

*Primary Examiner* — Nay A Maung
*Assistant Examiner* — Angelica M Perez
(74) *Attorney, Agent, or Firm* — Egan, Peterman, Enders & LLP

(57) ABSTRACT

Systems and methods are disclosed that provide WUSB (wireless universal serial bus) and wireless audio/video interfaces within a single device by integrating a Bluetooth subsystem with a WUSB hub and by providing shared operation between the UWB (ultra wide band) and Bluetooth subsystems. In one embodiment, a system includes both a UWB subsystem and a Bluetooth subsystem that are configured to share one or more operational parameters, such as device pairing information. As such, Bluetooth subsystems and the WUSB subsystems are allowed to cooperate and share information to streamline operation, and this streamlining allows the Bluetooth subsystem to handle isochronous operations, such as audio/video communications, and allows the UWB subsystem to continue to handle USB connected peripheral devices. The disclosed systems with WUSB and wireless audio/video interfaces can also be included as subsystems within other devices, such as display monitors or speaker systems for computer systems.

28 Claims, 5 Drawing Sheets

METHOD AND SYSTEM FOR PROVIDING CONCURRENT WIRELESS UNIVERSAL SERIAL BUS (WUSB) HUB AND WIRELESS AUDIO/VIDEO INTERFACES WITHIN A SINGLE DEVICE

TECHNICAL FIELD

The techniques described herein relate to methods and systems for communicating information between devices and, more particularly, for relatively short range communications.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Current Wireless Universal Serial Bus (WUSB) hubs have used Ultra Wide Band (UWB) radios for wireless communications. WUSB is a wireless technology extension of Universal Serial Bus (USB) ports. The UWB wireless technology used for WUSB wirelessly extends a USB hub, allowing a user to connect a laptop or other device to a WUSB hub using a UWB wireless link, instead of making this connection using a cable. A wide variety of USB devices can then be connected to the USB ports provided by the WUSB hub including standard USB peripherals, such as printers, scanners, keyboards, mice, and other USB connected devices.

Bluetooth based communications are often used for wireless audio products. Bluetooth is a short-range wireless communications protocol that allows two devices to communicate with each other after proceeding through a device pairing procedure. Bluetooth is used, for example, in cellular phones to connect headsets and in a computer system to connect a mouse and a keyboard. Bluetooth has also been used to connect audio speaker systems to a base system to provide audio outputs.

FIG. 1A (Prior Art) shows an environment 100 in which a personal computer (PC) 101 is configured to communicate with an audio system 112 through a Bluetooth radio and to communicate with a WUSB hub 119 through a UWB radio. As depicted, the personal computer 101 has a USB subsystem 102 and an audio subsystem 104. The USB subsystem 102 connects to a UWB control block 103 including, for example, the UWB software stack for handling the UWB communications for the USB subsystem 102. The UWB control block 103 is also connected to the radio circuitry 106 of the personal computer 101 and communicates using the UWB radio circuitry 108 through antenna 109 to form a UWB link 111.

The audio subsystem 104 is connected to a Bluetooth control block 105 including, for example, a Bluetooth software stack for handling Bluetooth communications for the audio subsystem 104. The Bluetooth control block 105 can also included related information such as audio parameters and usage profiles. The Bluetooth control block 105 communicates using the Bluetooth radio circuitry 107 within the personal computer radio circuitry 106 to form a Bluetooth link 110 through antenna 109.

As depicted, a single antenna 109 receives input from both the Bluetooth radio circuitry 107 and the UWB radio circuitry 108. The single antenna 109 allows the USB subsystem 102 and the audio subsystem 104 of the personal computer 101 to communicate with a Bluetooth (BT) audio system 112 and a separate WUSB hub 119 through this single shared antenna 109. It is noted, however, that the BT and UWB radio circuitry may use separate antennas (not shown in FIG. 1A) to communicate with the BT audio system and WUSB hub, if desired, rather than using the single shared antenna 109.

The WUSB hub 119 communicates using antenna 118. The UWB radio circuitry 120 is coupled to the antenna 118 and to the UWB control block 121 including, for example, a UWB software stack for handling the UWB communications for the WUSB hub 119. The UWB control block 121 is also coupled to a USB port hub controller 122, and the USB port hub controller 122 provides a plurality (N) of USB ports 123 to which external USB devices can be connected.

The audio system 112 communicates using the antenna 117. The Bluetooth radio circuitry 115 is coupled to the antenna 117 and to the Bluetooth control block 113 including, for example, a Bluetooth software stack for handling Bluetooth communications for the audio subsystem 112. The Bluetooth control block 113 can also include related information such as audio parameters and usage profiles. The Bluetooth control block 113 communicates with the audio subsystem 114 to output audio information to the speakers (SPKRS) 116 and/or receive audio information from the microphone (MIC) 126.

FIG. 1B (Prior Art) shows the device pairing steps involved in using the systems shown in FIG. 1A (Prior Art). The process begins when the personal computer system is booted up in step 130. In step 131, the user inputs required information for WUSB device pairing, and then WUSB profiles are launched in step 132. User input is required again for Bluetooth (BT) device pairing in step 133. In step 134, Bluetooth audio profiles are launched, again requiring user input. The process ends at step 135. As shown in FIG. 1B (Prior Art), therefore, separate pairings are required for the WUSB hub device and for the Bluetooth device.

One solution has been proposed to add isochronous audio support to WUSB. WUSB protocols do not efficiently handle audio/video connections that are isochronous or otherwise sensitive to time-of-delivery. Adding isochronous support to WUSB, however, can use a large amount of bandwidth of the WUSB link. For example, if a laptop were using a WUSB hub to connect to USB peripherals in addition to supporting an audio system through the UWB link, the audio system will likely use a large portion of the wireless link bandwidth to handle the audio delivery, thereby degrading the performance of the other USB connected peripheral devices.

While Bluetooth can better handle isochronous data flow to support audio/video peripheral devices, Bluetooth is relatively slow. Solutions have been proposed to add improved speed to Bluetooth communications. To improve this speed, the proposed Bluetooth 3.0 protocol describes the use of a UWB radio, rather than a standard Bluetooth radio, along with a Bluetooth software stack to improve communication speeds. However, this solution does not provide support for USB peripherals.

SUMMARY

Systems and methods disclosed herein provide WUSB (wireless universal serial bus) and wireless audio/video interfaces in a single device body by integrating a Bluetooth subsystem with a WUSB hub and by providing shared operation between the UWB (ultra wide band) and Bluetooth subsystems. In one embodiment, a system that can be paired with another system, such as a computer system, includes both a UWB subsystem and a Bluetooth subsystem that are configured to share one or more operational parameters, such as device pairing information. As such, the Bluetooth subsystem and the UWB subsystem are allowed to cooperate and share information to streamline operation, and this streamlining allows the Bluetooth subsystem to handle isochronous data operations, such as audio/video communications, and allows the WUSB subsystem to continue to handle USB connected peripheral devices. The disclosed systems having WUSB and wireless audio/video interfaces can also be included as subsystems within other devices, such as display monitors or speaker systems for computer systems. As described below, other features and variations can be implemented, if desired, and related systems and methods can be utilized as well.

DESCRIPTION OF THE DRAWINGS

It is noted that the appended drawings illustrate only exemplary embodiments of the techniques described herein and are, therefore, not to be considered limiting of its scope, for the. techniques may admit to other equally effective embodiments.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a server computer system, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The techniques described herein provide a method and system for providing Wireless Universal Serial Bus (WUSB) and wireless audio/video interfaces in a single device body. The systems disclosed include Ultra Wide Band (UWB) subsystems and Bluetooth (BT) subsystems such that the UWB subsystem and Bluetooth subsystem are configured to communicate with each other to share one or more operational parameters, such as device pairing information. Advantages of the disclosed audio/video-enabled and WUSB-enabled systems include reducing cost by integrating a Bluetooth audio/video subsystem with the WUSB hub to enable a single product, sharing WUSB hub resources (e.g., antennas, power supplies, and other components) to further reduce the overall solution cost, and allowing for efficient cooperation between the WUSB subsystem and the Bluetooth subsystem to more efficiently optimize operations. For example, in the embodiments described herein establishment of the second wireless link (e.g., Bluetooth) and related profiles after the first wireless link (e.g. UWB) has been established can be automatically triggered. This automatic triggering advantageously eliminates several user steps that would otherwise be required for separate Bluetooth and WUSB pairings, as described in more detail below.

Figure 2A:
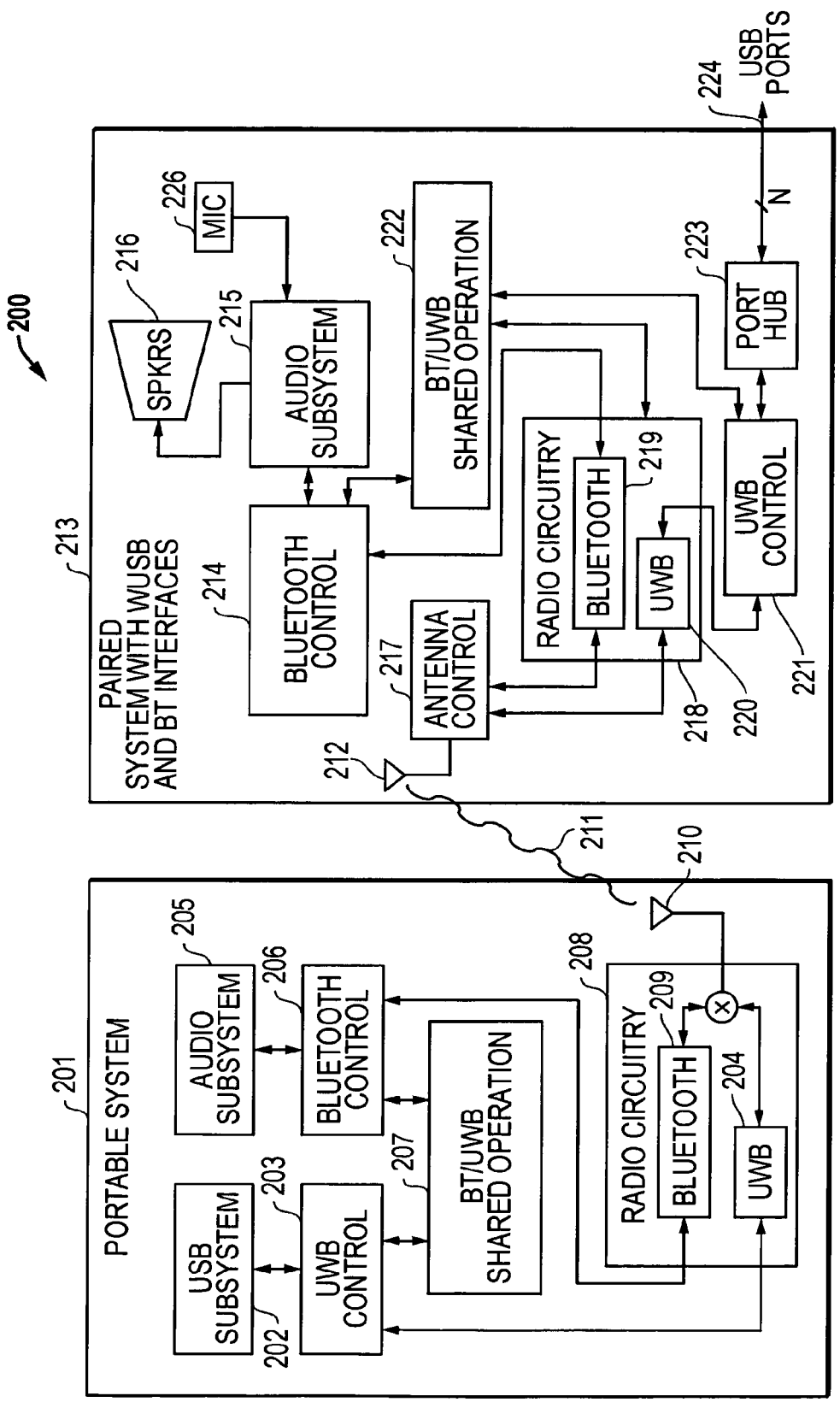
FIG. 2A is a block diagram of a portable system communicating with a second device having WUSB and wireless audio/video interfaces as described herein using cooperating Bluetooth and UWB subsystems.

FIG. 2A is a block diagram for an environment 200 including a portable system 201 communicating with a paired system 213 having WUSB and a wireless audio/video interfaces within a single device using UWB (ultra wide band) subsystems and Bluetooth (BT) subsystems. It is also noted that as used herein, the term "audio/video" refers to audio or video or both audio and video.

As depicted, the portable system 201 includes a USB subsystem 202 and an audio subsystem 205. The USB subsystem 202 is coupled to a UWB control block 203 that includes, for example, the UWB software stack for handling the UWB communications for the USB port hub 122. The UWB control block 203 also communicates with a BT/UWB shared operation block 207. Shared operation block 207 can include, for example, authentication information, device pairing information, usage profiles and other shared operational information. The USB subsystem 202 is also coupled to a UWB radio circuitry 204 within portable system radio circuitry 208. The UWB radio circuitry 202 communicates through antenna 210 to form a UWB link through communication path 211.

It is noted that the portable system 201 could be implemented as a portable computer system, such as a laptop computer. However, a desktop computer system could also be the system that pairs with the paired system 213. In such an embodiment, the desktop computer with by system 201.

The audio subsystem 205 connects to a Bluetooth control block 206 that includes, for example, a Bluetooth software stack for handling Bluetooth communications for the audio subsystem 205. The Bluetooth control block 206 can also include related information such as audio parameters and usage profiles. The Bluetooth control block 206 is also coupled to the BT/UWB shared operation block 207. The Bluetooth control block 206 is further coupled to Bluetooth radio circuitry 209 within portable system radio circuitry 208. The Bluetooth radio circuitry 202 communicates through antenna 210 to form a Bluetooth link through communication path 211.

As depicted, a single antenna 210 receives input from both the Bluetooth radio circuitry 209 and the UWB radio circuitry 204. The single antenna 210 allows the USB subsystem 202 and the audio subsystem 205 of the personal computer 201 to communicate with the paired system 213 through this single shared antenna 210. It is noted, however, that the BT and UWB radio circuitry may use separate antennas (not shown in FIG. 2A) to communicate with the BT audio system and WUSB hub within the paired system 213, if desired, rather than using the single shared antenna 210.

The paired system 213 has a USB port hub controller 223 coupled to a UWB control block 221, and the paired system 213 also has an audio subsystem 215 coupled to a Bluetooth subsystem control block 214 within an integrated device body for the paired system 213. The UWB subsystem control block 221 includes a UWB software stack and is configured to communicate with BT/UWB shared operation block 222 that can include device authentication information, device pairing, usage profiles and other operational information. The UWB control block 221 is also coupled to UWB radio circuitry 220 within the radio circuitry 218 for the paired system 213. The UWB radio circuitry 220 communicates through antenna control circuitry 217 and antenna 212 to form a UWB link through communication path 211. Further, one or more (N) USB ports 224 are coupled to the UWB control block 221 through the USB port hub controller 223. USB peripheral devices, such as printers, scanner, keyboards, a mouse, or the like can be coupled to the USB ports 224.

The paired system 213 also includes an integrated audio subsystem 215 and Bluetooth control block 214 coupled to the device body for the paired system 213. The Bluetooth control block 214 can include a Bluetooth software stack, audio information and usage profiles. The Bluetooth module 214 is also coupled to Bluetooth radio circuitry 219 within the radio circuitry 218 for the paired system 213. The Bluetooth radio circuitry 219 communicates through antenna control circuitry 217 and antenna 212 to form a Bluetooth link through communication path 211.

As depicted, audio subsystem 215 can in turn be coupled to speakers (SPKRS) 216 and/or a microphone (MIC) 226. It is noted, however, that the audio subsystem 215 could also be coupled to external speakers and/or microphones through appropriate connectors include as part of the paired system 213. In other words, the speakers (SPKRS) 216 and/or the microphone (MIC) 226 could be located external to the device body for the paired system 213, and such external speakers (SPKRS) and/or microphones (MICs) could be coupled to external audio/video connections for the paired system 213.

As described herein, the UWB control block 221 and the Bluetooth control block 214 are configured to share one or more operational parameters by being coupled to the BT/UWB shared operation block 222. The BT/UWB shared operation block 222 can include device authentication information, usage profiles and other shared operational information. As such, the Bluetooth control block 214 and the UWB control block 221 can both take advantage of shared authentication, device pairing, usage profiles and/or other operational parameters within BT/UWB shared operation block 222. This sharing allows the Bluetooth control block 214 and the UWB control block 221 to cooperate for operational efficiencies, for example, through sharing of device pairing information.

As depicted, a single antenna 212 receives input from both the Bluetooth subsystem control circuitry 214 and the UWB subsystem control circuitry 221. The single antenna 212 allows the USB port hub 223 and the audio subsystem 215 of the paired system 213 to communicate with the portable system 201 through this single shared antenna 211. It is noted, however, that the BT and UWB radio circuitry may use separate antennas (not shown in FIG. 2A) to communicate with the BT audio system and WUSB hub within the portable system 201, if desired, rather than using the single shared antenna 212.

Figure 2B:
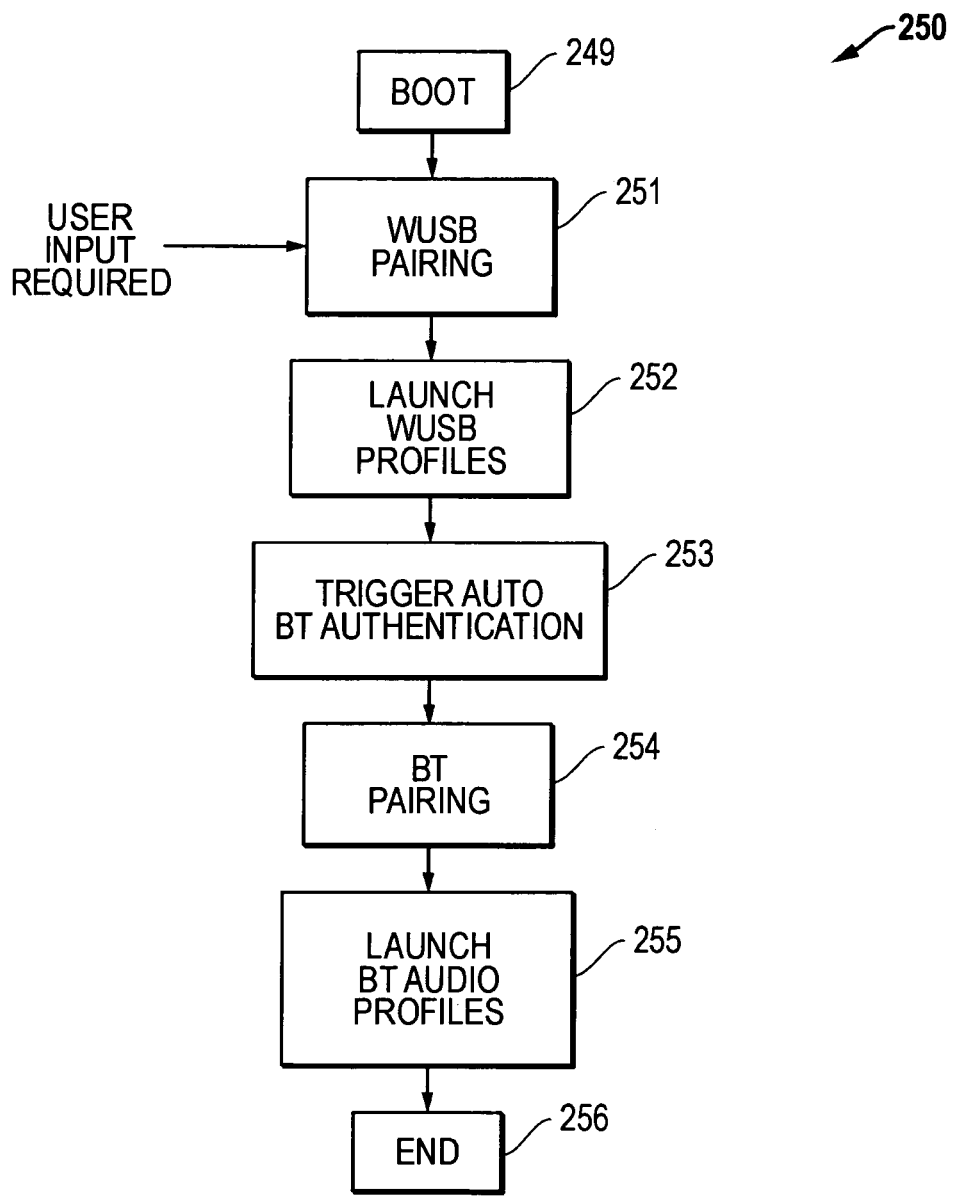
FIG. 2B is a flowchart of the method for providing device pairing in the system of FIG. 2B.

FIG. 2B is a flowchart of the method 250 for providing device pairing in the system of FIG. 2A. The process begins in step 250 when a system is booted up. In step 251, user input are required for a WUSB device pairing. In step 252, WUSB profiles are launched. In step 253, Bluetooth authentication is automatically triggered and processed. In step 254, Bluetooth device pairing occurs without requiring any further user input. Bluetooth audio profiles are then launched in step 255. The process ends with step 256.

Figure 1A:
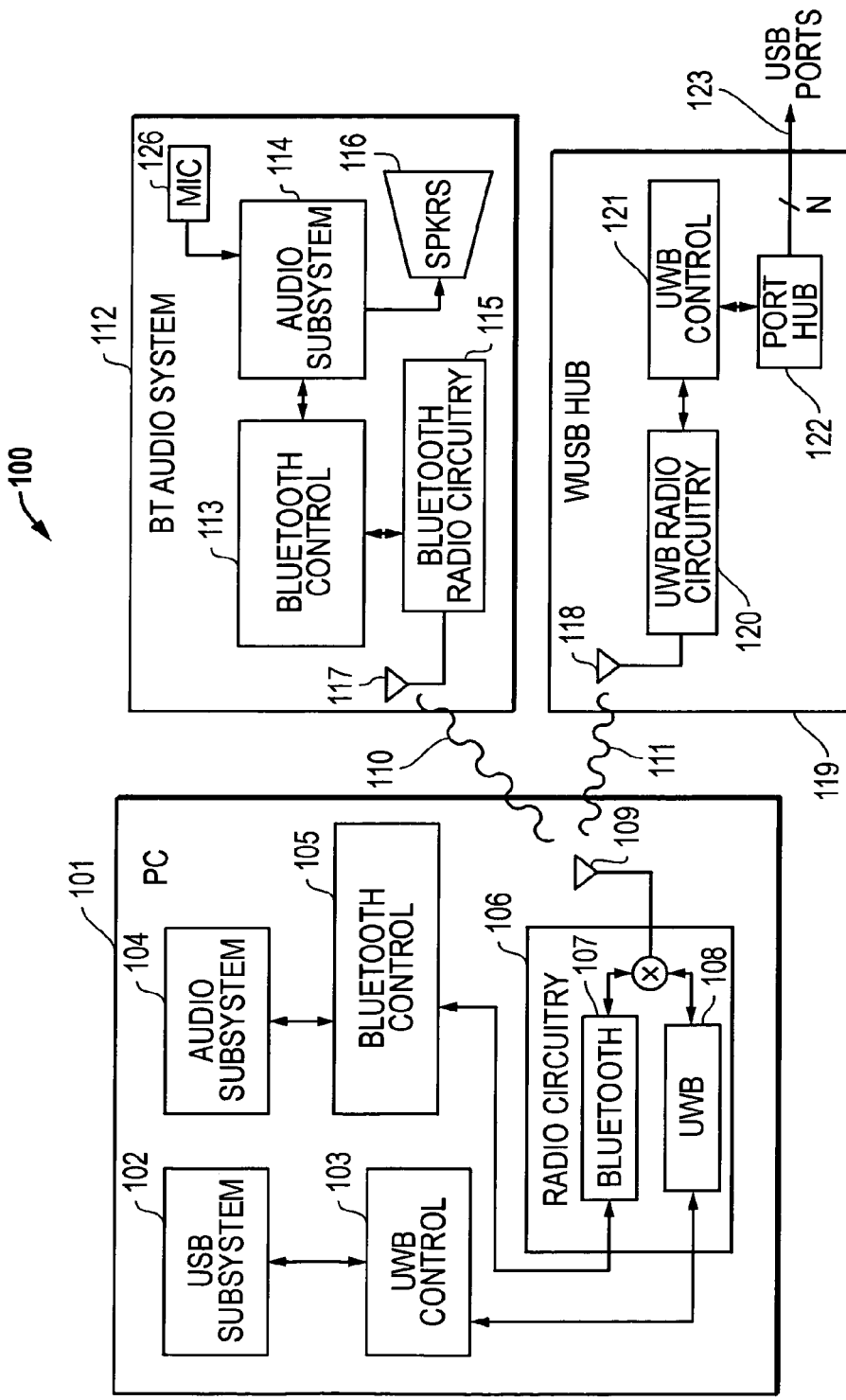
FIG. 1A (Prior Art) is a block diagram of a Bluetooth audio system and WUSB hub communicating with a personal computer through separate communication paths.
Figure 1B:
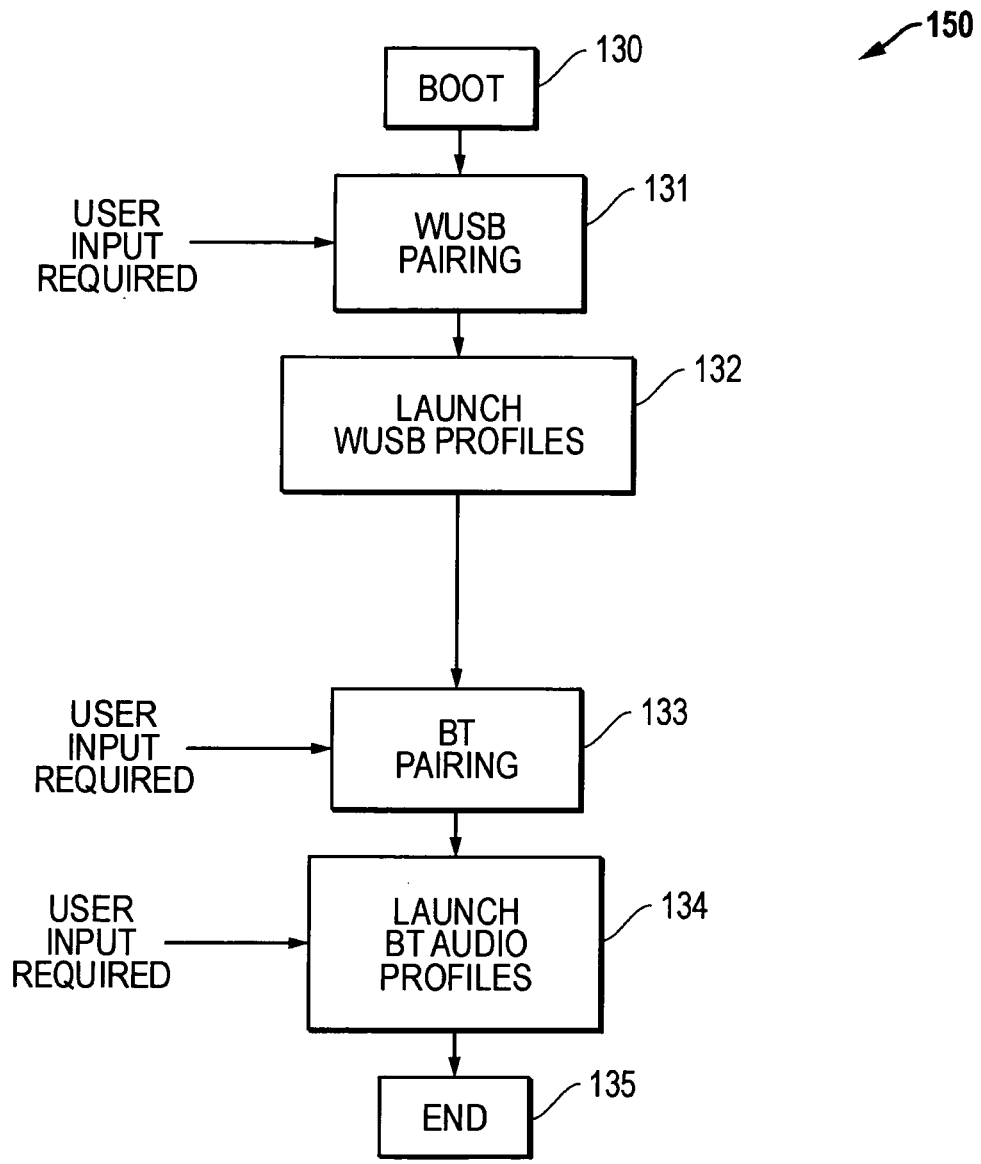
FIG. 1B (Prior Art) is a flowchart of a method for wirelessly connecting the personal computer of FIG. 1A (Prior Art) to the Bluetooth system and the separate UWB system via separate device pairing routines.

As seen in FIG. 2B and as compared to FIG. 1B (Prior Art), the ease-of-use has been greatly improved for the end user. The process of FIG. 2B provides the ability to enhance ease-of-use in the combined architecture where the portable system and the paired system each has a BT radio and a UWB radio such that device pairing is extended and propagated between the two radios. Advantageously, users are only required once to enter pairing information. This pairing can still use standard industry techniques for implementing device pairing, such as PIN-based methods often applied in current devices. The shared pairing, however, is enabled because the portable system has control of both its BT and UWB radios and because the paired system also has control of both its BT and UWB radios.

In operation, the systems and methods disclosed herein provide numerous advantages. For example, the solutions disclosed herein provide the advantage of audio/video data support coupled with WUSB functionality while still providing a singled device that can support internal speakers and/or microphones. Operating distances are improved for the portable system because the Bluetooth audio support allows for greater separation from the WUSB hub than would be possible if audio functionality were enabled without the UWB link. Bluetooth has better link margin than UWB to maintain the quality of audio communications, and Bluetooth range has improved over the generations of Bluetooth devices. Utilizing Bluetooth to carry audio also frees up significant more bandwidth for WUSB communications (i.e., for USB peripherals attached to the hub) than would be possible where the WUSB link was also used to provide audio support. Further, no cost additions are required on the portable system side because combination mini-cards are available for BT radio/WUSB-UWB radio combinations.

As discussed above, one added advantage is provided that device pairing can be triggered across the software stacks used for BT control and UWB control while requiring reduced interaction with the end user. Once a UWB link has been paired between the portable system and the WUSB/BT systems described herein, the BT link can be automatically triggered and paired. Similarly, once a BT link has been paired between the portable system and the WUSB/BT systems described herein, the UWB link can be automatically triggered and paired.

As a further advantage, the embodiments disclosed herein can be incorporated into existing products that are used for audio support in existing computer systems and peripheral systems. For example, the WUSB/BT systems disclosed herein can be included within other products, such as display monitors and speaker systems (e.g., Dell SoundBar product). In such an embodiment, for example, the audio/USB hub (e.g., SoundBar) can integrate a combination BT radio and WUSB-UWB radio to eliminate the USB cable and the audio cables between the portable system and the display monitor plus audio/USB device.

Figure 3:
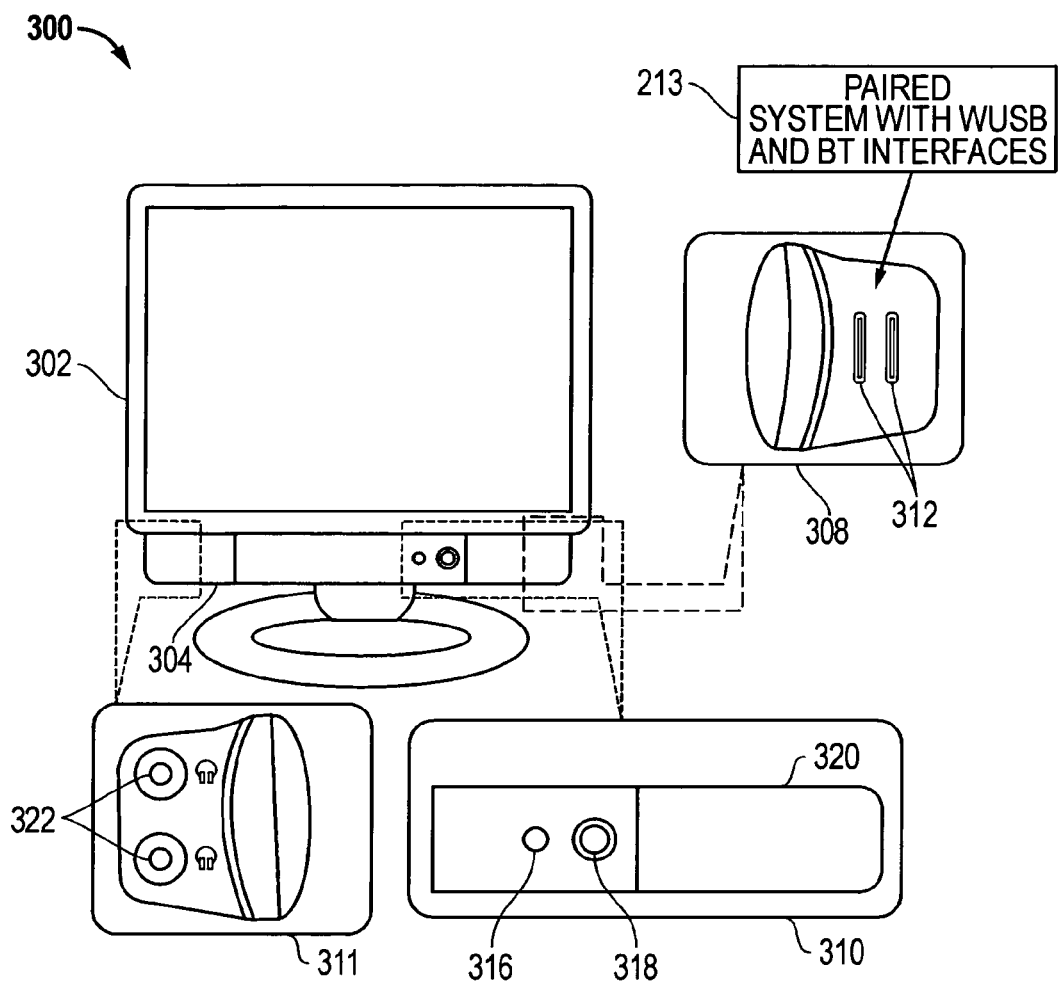
FIG. 3 is a diagram for an embodiment in which a system having WUSB and wireless audio/video interfaces is included within a speaker system coupled to a display monitor for a computer system.

FIG. 3 is a diagram for an embodiment 300 including a display monitor 302 and an paired system 213 in the form of a speaker system 304 that attaches to the bottom of the monitor 302. In particular, the paired system 213 of FIG. 2A that includes UWB-USB support and BT audio support can be included within the speaker system 304 to provide support for both an audio subsystem and a wireless USB subsystem. In a traditional monitor, USB ports as part of a USB hub are often included in the edge of the monitor itself. In contrast, as depicted, USB ports 312 are included in the edge of the speaker system (e.g., SoundBar) 304 as shown in exploded side view 308 instead of or in addition to the monitor. These USB ports 312 can be coupled to a USB port hub controller 223 in the paired system 213 within speaker system 304. As in a traditional speaker system, a power indicator 316, a volume control 318 and speakers 320 can be included, as shown in exploded front view 310. As also in a traditional speaker system, headphone jacks 322 can also be included, for example, in the side of the speaker system 304, as shown in exploded side view 306. Advantageously, in the embodiment of FIG. 3, no USB cables and audio cables are needed between a computer system and the monitor 302 and/or speaker system 304, and the speaker system 304 provides both audio output and USB inputs.

It is noted that the embodiment 300 could be modified such that the paired system 213 and the speakers are separate devices. For example, speakers could be integrated with the display monitor 302, and the paired system 213 could be a separate device. The speakers could then be coupled to external audio/video connection ports on the paired system 213.

Further modifications and alternative embodiments of the techniques described herein will be apparent to those skilled in the art in view of this description. It will be recognized, therefore, that the techniques described herein are not limited by these example arrangements. Accordingly, this description is to be construed as illustrative only and is for the purpose of teaching those skilled in the art the manner of carrying out the techniques described herein. It is to be understood that the forms of the techniques described herein shown and described are to be taken as the presently preferred embodiments. Various changes may be made in the implementations and architectures. For example, equivalent elements may be substituted for those illustrated and described herein and certain features of the techniques described herein may be utilized independently of the use of other features, all as would be apparent to one skilled in the art after having the benefit of this description of the techniques.

What is claimed is:

1. A system having WUSB (wireless universal serial bus) and Bluetooth audio/video interfaces within a single device body, comprising:
a UWB (ultra wide band) subsystem coupled within a device body and configured to communicate with an external UWB subsystem;
one or more USB ports coupled to the UWB subsystem within the device body and configured to be coupled to external USB devices; and
a Bluetooth subsystem coupled within the device body and configured to communicate with an external Bluetooth subsystem to receive audio/video data;
wherein the UWB subsystem and the Bluetooth subsystem are configured to communicate with each other to share one or more operational parameters, the one or more operational parameters including device pairing information provided by a user with respect to either the external UWB subsystem or the external Bluetooth subsystem;
wherein the UWB device pairing information, if provided by the user, is configured to be used to establish a first wireless link between the UWB subsystem and the external UWB subsystem and is also configured to be used to automatically establish a second wireless link between the Bluetooth subsystem and the external Bluetooth subsystem without requiring additional Bluetooth device pairing information to be provided by the user; and
wherein the Bluetooth device pairing information, if provided by the user, is configured to be used to establish a first wireless link between the Bluetooth subsystem and the external Bluetooth subsystem and is also configured to be used to automatically establish a second wireless link between the UWB subsystem and the external UWB subsystem without requiring additional UWB device pairing information to be provided by the user.

2. The system of claim 1, further comprising UWB radio circuitry, Bluetooth radio circuitry and one or more antennas.

3. The system of claim 2, wherein the UWB radio circuitry and the Bluetooth radio circuitry are configured to share a single antenna.

4. The system of claim 1, wherein the Bluetooth subsystem is coupled to an audio subsystem.

5. The system of claim 4, wherein the audio subsystem comprises one or more speakers.

6. The system of claim 4, further comprising one or more audio/video connections configured to be coupled to an external speaker system.

7. The system of claim 6, wherein the external speaker system is integrated within a housing for a display monitor.

8. The system of claim 7, wherein the speaker system is configured to be coupled to a display monitor.

9. The system of claim 1, wherein the device body comprises a speaker system.

10. The system of claim 1, wherein the device pairing information provided by the user is configured for use in a PIN-based method for device pairing.

11. The system of claim 1, wherein the first wireless link is configured to be between the UWB subsystem and the external UWB subsystem and wherein the second wireless link is configured to be between the Bluetooth subsystem and the external Bluetooth subsystem.

12. A system of paired devices having WUSB (wireless universal serial bus) and Bluetooth audio/video interfaces, comprising:
a computer system, comprising:
a UWB (ultra wide band) subsystem coupled within the computer system; and
a Bluetooth subsystem coupled within the computer system;
wherein the UWB subsystem and the Bluetooth subsystem are configured to communicate with each other to share device pairing information provided by a user with respect to either the external UWB subsystem or the external Bluetooth subsystem; and a second system paired with the computer system having WUSB and Bluetooth audio/video interfaces within a single device body, comprising:
- a UWB (ultra wide band) subsystem coupled within a device body and configured to communicate with the UWB subsystem in the computer system;
- one or more USB ports coupled to the UWB subsystem within the device body and configured to be coupled to external USB devices; and
- a Bluetooth subsystem coupled within the device body and configured to communicate with the Bluetooth subsystem in the computer system to receive audio/video data;
- wherein the UWB subsystem and the Bluetooth subsystem are configured to communicate with each other to share the device pairing information provided by the user with respect to either the UWB subsystems or the Bluetooth subsystems;
- wherein the UWB device pairing information, if provided by the user, is configured to be used to establish a first wireless link between the UWB subsystem in the computer system and the UWB subsystem in the second system and is also configured to be used to automatically establish a second wireless link between the Bluetooth subsystem in the computer system and the Bluetooth subsystem within the second system without requiring additional Bluetooth device pairing information to be provided by the user; and
- wherein the Bluetooth device pairing information, if provided by the user, is configured to be used to establish a first wireless link between the Bluetooth subsystem in the computer system and the Bluetooth subsystem in the second system and is also configured to be used to automatically establish a second wireless link between the UWB subsystem in the computer system and the UWB subsystem within the second system without requiring additional device pairing information to be provided by the user.

13. The system of claim 12, wherein the device pairing information provided by the user is configured for use in a PIN-based method for device pairing.

14. The system of claim 12, wherein the computer system is a portable computer.

15. The system of claim 12, wherein the computer is a desktop computer.

16. The system of claim 12, wherein the device body for the second system is a speaker system.

17. The system of claim 16, wherein the speaker system is configured to be coupled to a display monitor.

18. The system of claim 12, wherein the Bluetooth subsystems are coupled to audio subsystems.

19. The system of claim 12, wherein the first wireless link is configured to be between the UWB subsystem and the external UWB subsystem and wherein the second wireless link is configured to be between the Bluetooth subsystem and the external Bluetooth subsystem.

20. A method for providing WUSB (wireless universal serial bus) and Bluetooth audio/video interfaces within a single device body, comprising:
- communicating with an external UWB (ultra wide band) subsystem using a UWB subsystem coupled within a device body;
- communicating to one or more external USB devices through one or more USB ports coupled to the UWB subsystem;
- communicating with an external Bluetooth subsystem using a Bluetooth subsystem coupled within the device body to receive audio/video data;
- sharing one or more operational parameters between the UWB subsystem and the Bluetooth subsystem during the communicating steps, the one or more operational parameters including device pairing information provided by a user with respect to either the external UWB subsystem or the external Bluetooth subsystem;
- using the UWB device pairing information, if provided by the user, to establish a first wireless link between the UWB subsystem and the external UWB subsystem and to automatically establish a second wireless link between the Bluetooth subsystem and the external Bluetooth subsystem without requiring additional Bluetooth device pairing information to be provided by the user; and
- using the Bluetooth device pairing information, if provided by the user, to establish a first wireless link between the Bluetooth subsystem and the external Bluetooth subsystem and to automatically establish a second wireless link between the UWB subsystem and and the external UWB subsystem without requiring additional device pairing information to be provided by the user.

21. The method of claim 20, further comprising utilizing one or more antennas to provide UWB and Bluetooth communications in the communicating steps.

22. The method of claim 21, further comprising utilizing a single shared antenna to provide UWB and Bluetooth communications in the communicating steps.

23. The method of claim 20, further comprising communicating audio signals from the Bluetooth subsystem to an audio subsystem.

24. The method of claim 20, further comprising outputting the audio signals through one or more speakers.

25. The method of claim 20, further comprising providing a speaker system as the device body.

26. The system of claim 25, wherein the speaker system is configured to be coupled to a display monitor.

27. The method of claim 20, wherein the device pairing information provided by the user is configured for use in a PIN-based method for device pairing.

28. The method of claim 20, wherein the first wireless link is between the UWB subsystem and the external UWB subsystem and wherein the second wireless link is between the Bluetooth subsystem and the external Bluetooth subsystem.

* * * * *